(12) United States Patent
Black et al.

(10) Patent No.: US 12,479,781 B2
(45) Date of Patent: Nov. 25, 2025

(54) PROCESS FOR THE PREPARATION OF ETHYLENE GLYCOL

(71) Applicant: SHELL USA, INC., Houston, TX (US)

(72) Inventors: Jesse Raymond Black, Houston, TX (US); Gregory John Ward, Houston, TX (US); Christopher Paul Emborsky, Houston, TX (US); Roel Guillaume Hubertus Leonardus Bastings, Amsterdam (NL)

(73) Assignee: SHELL USA, INC., Houston, TX (US)

( * ) Notice: Subject to any disclaimer, the term of this patent is extended or adjusted under 35 U.S.C. 154(b) by 727 days.

(21) Appl. No.: 17/785,514

(22) PCT Filed: Jan. 4, 2021

(86) PCT No.: PCT/EP2021/050008
§ 371 (c)(1),
(2) Date: Jun. 15, 2022

(87) PCT Pub. No.: WO2021/140063
PCT Pub. Date: Jul. 15, 2021

(65) Prior Publication Data
US 2023/0032856 A1 Feb. 2, 2023

(30) Foreign Application Priority Data
Jan. 9, 2020 (EP) ..................... 20150987

(51) Int. Cl.
*C07C 29/12* (2006.01)
*B01J 27/08* (2006.01)
*C07C 29/80* (2006.01)

(52) U.S. Cl.
CPC ............... *C07C 29/12* (2013.01); *B01J 27/08* (2013.01); *C07C 29/80* (2013.01)

(58) Field of Classification Search
CPC ....... C07C 31/202; C07C 29/76; C07C 29/12; B01J 27/08
See application file for complete search history.

(56) References Cited

U.S. PATENT DOCUMENTS 5,763,691 A 6/1998 Kawabe et al.
6,080,897 A * 6/2000 Kawabe .................. C07C 29/12
549/230

(Continued)

FOREIGN PATENT DOCUMENTS

GB 2107712 A 5/1983

OTHER PUBLICATIONS

International Search Report and Written Opinion received for PCT Patent Application No. PCT/EP2021/050008, mailed on Apr. 13, 2021, 8 pages.

*Primary Examiner* — Jafar F Parsa
(74) *Attorney, Agent, or Firm* — SHELL USA, INC.

(57) ABSTRACT

A process for the preparation of ethylene glycol comprising the steps of: a) supplying a first gas composition comprising ethylene oxide and carbon dioxide to an ethylene oxide absorber and allowing the gas composition to pass upwards through an absorption section; b) supplying a lean absorbent to the top of the absorption section and allowing the lean absorbent to pass downwards through the absorption section; c) intimately contacting the gas composition with lean absorbent on the trays in the absorption section in the presence of one or more catalysts to produce a fat absorbent stream comprising ethylene glycol and ethylene carbonate; d) withdrawing fat absorbent from the absorber; and e) withdrawing a second gas composition from the top of the absorber.

11 Claims, 12 Drawing Sheets

(56) References Cited

U.S. PATENT DOCUMENTS

| | | |
|---|---|---|
| 9,365,535 B2 | 6/2016 | Van Kruchten et al. |
| 10,279,280 B2 | 5/2019 | Wilkinson et al. |
| 2017/0291119 A1* | 10/2017 | Wilkinson ............ C07C 29/106 |

* cited by examiner

PROCESS FOR THE PREPARATION OF ETHYLENE GLYCOL

CROSS REFERENCE TO RELATED APPLICATIONS

This is a National stage application of International application No PCT/EP2021/050008, filed 4 Jan. 2021, which claims priority of EP Application Serial No. 20150987.4, filed 9 Jan. 2020 which is incorporated herein by reference in its entirety.

FIELD OF THE INVENTION

The present invention relates to a process for the preparation of ethylene glycol from ethylene.

BACKGROUND

Monoethylene glycol is used as a raw material in the manufacture of polyester fibres, polyethylene terephthalate (PET) plastics and resins. It is also incorporated into automobile antifreeze liquids.

Monoethylene glycol is typically prepared from ethylene oxide, which is in turn prepared from ethylene. Ethylene and oxygen are passed over a silver oxide catalyst, typically at pressures of 10-30 bar and temperatures of 200-300° C., producing a product stream comprising ethylene oxide (EO), carbon dioxide, ethylene, oxygen and water. The amount of ethylene oxide in the product stream is usually between about 0.5 and 10 weight percent. The product stream is supplied to an ethylene oxide absorber and the ethylene oxide is absorbed by a re-circulating solvent stream containing mostly water. The ethylene oxide-depleted stream is partially or entirely supplied to a carbon dioxide absorption column wherein the carbon dioxide is at least partially absorbed by a re-circulating absorbent stream. Gases that are not absorbed by the re-circulating absorbent stream are recombined with any gases bypassing the carbon dioxide absorption column and are recycled to the ethylene oxide reactor.

The solvent stream leaving the ethylene oxide absorber is referred to as fat absorbent. In the above described processes, the fat absorbent is supplied to an ethylene oxide stripper, where ethylene oxide is removed from the fat absorbent as a vapor stream. The ethylene oxide-depleted solvent stream is referred to as lean absorbent and is re-circulated to the ethylene oxide absorber to absorb further ethylene oxide.

The ethylene oxide obtained from the ethylene oxide stripper can be purified for storage and sale or can be further reacted to provide ethylene glycol. In one well-known process, ethylene oxide is reacted with a large excess of water in a non-catalytic process. This reaction typically produces a glycol product stream consisting of almost 90 wt % monoethylene glycol, the remainder being predominantly diethylene glycol, some triethylene glycol and a small amount of higher homologues. In another well-known process, ethylene oxide is catalytically reacted with carbon dioxide to produce ethylene carbonate. The ethylene carbonate is subsequently hydrolyzed to provide ethylene glycol. The reaction via ethylene carbonate significantly improves the selectivity of ethylene oxide conversion to monoethylene glycol.

Efforts have been made to simplify the process for obtaining ethylene glycol from ethylene, reducing the equipment that is required and reducing the energy consumption. GB 2107712 describes a process for preparing monoethylene glycol where the gases from the ethylene oxide reactor are supplied directly to a reactor where ethylene oxide is converted to ethylene carbonate or to a mixture of ethylene glycol and ethylene carbonate.

EP 776890 describes a process where the gases from the ethylene oxide reactor are supplied to an absorber where the absorbing solution mainly contains ethylene carbonate and ethylene glycol. The ethylene oxide in the absorbing solution is supplied to a carboxylation reactor and allowed to react with carbon dioxide in the presence of a carboxylation catalyst. The ethylene carbonate in the absorbing solution is subsequently supplied, with the addition of water, to a hydrolysis reactor and subjected to hydrolysis in the presence of a hydrolysis catalyst.

EP 2178815 describes a reactive absorption process for preparing monoethylene glycol where the gases from the ethylene oxide reactor are supplied to an absorber and the ethylene oxide is contacted with lean absorbent comprising at least 20 wt % water in the presence of one or more catalysts that promote carboxylation and hydrolysis and the majority of the ethylene oxide is converted to ethylene carbonate or ethylene glycol in the absorber.

Towers or columns allowing the intimate gas-liquid contacting required for such absorption are well known in the art and are referred to, for example, as fractionation, distillation or absorption towers. Such towers or columns contain trays stacked vertically through the column and are designed to conduct liquids in a zig-zag course downwardly through the column while admitting gases upwardly into horizontal-flowing portions of the liquid for intimate contact with the liquid.

It would be desirable to provide a further improved reactive absorber process for the manufacture of ethylene glycol from ethylene with better conversion of the ethylene oxide to ethylene carbonate and ethylene glycol, reduced concentration of byproducts and improved selectivity to the desired monoethylene glycol product.

SUMMARY OF THE INVENTION

The invention provides a process for the preparation of ethylene glycol from ethylene comprising the steps of:
  a) supplying a first gas composition comprising ethylene oxide and carbon dioxide, preferably comprising ethylene oxide, ethylene, oxygen, carbon dioxide and water vapor, to an ethylene oxide absorber through a gas inlet, the absorber comprising an absorption section of vertically stacked trays, and allowing the gas composition to pass upwards through the absorption section;
  b) supplying a lean absorbent to the top of the absorption section and allowing the lean absorbent to pass downwards through the absorption section;
  c) intimately contacting the gas composition with lean absorbent on the trays in the absorption section in the presence of one or more catalysts that promote carboxylation and hydrolysis to produce a fat absorbent stream comprising ethylene glycol and ethylene carbonate;
  d) withdrawing fat absorbent from the absorber; and
  e) withdrawing a second gas composition from the top of the absorber;
wherein the first gas composition comprises at least 1 mol % of ethylene oxide, preferably 1 to 7 mol % of ethylene oxide, the second gas composition comprises at least 1 mol % carbon dioxide, preferably from 1 to 10 mol % carbon dioxide, and the temperature of the first gas composition is at least 60° C., preferably from 60° C. to 160° C.

As compared to earlier described reactive absorption processes for preparing monoethylene glycol, a process with better conversion of the ethylene oxide to ethylene carbonate and ethylene glycol, reduced concentration of byproducts and improved selectivity to the desired monoethylene glycol product has been obtained with the process of the present invention.

DETAILED DESCRIPTION

Figure 1:
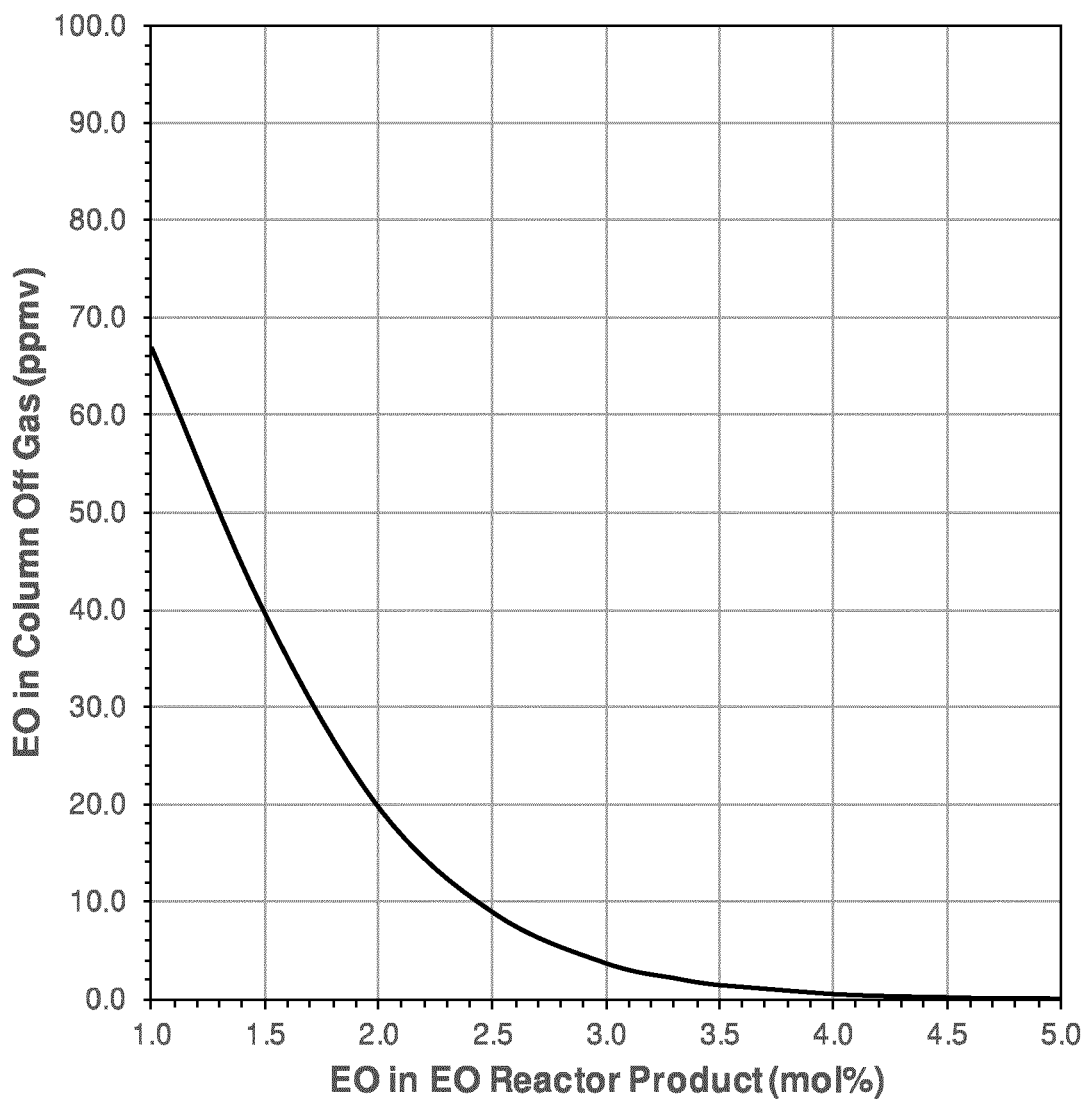
FIG. 1 depicts data from Example 2.

The present invention provides a process for the preparation of ethylene glycol, also referred to as 1,2-ethanediol, also referred to as monoethylene glycol. In this process ethylene glycol is prepared from ethylene, also referred to as ethene, $C_2H_4$.

The invention provides a process for the preparation of ethylene glycol. Ethylene glycols are generally produced from ethylene as set out below:

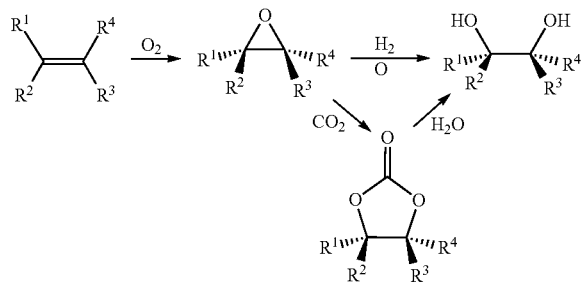

$R^1$, $R^2$, $R^3$ and $R^4$ are preferably chosen from hydrogen or an optionally substituted alkyl group having from 1 to 6 carbon atoms, more preferably from 1 to 3 carbon atoms. As substituents, moieties such as hydroxy groups may be present. Preferably, $R^1$, $R^2$ and $R^3$ represent hydrogen atoms and $R^4$ represents hydrogen or a non-substituted $C_1$-$C_3$-alkyl group and, more preferably, $R^1$, $R^2$, $R^3$ and $R^4$ all represent hydrogen atoms.

In the first reaction shown above, ethylene and oxygen are reacted to form ethylene oxide. This preferably is performed in the presence of a catalyst, for example a silver comprising catalyst. This reaction may be performed in a reactor, which may be referred to as an ethylene oxide reactor. By-products may be formed. For example, carbon dioxide and water may be formed as by-products. A gas composition from an ethylene oxide reactor thus may comprise ethylene oxide, unreacted ethylene, unreacted oxygen, carbon dioxide and water.

In the present invention a first gas composition comprising ethylene oxide and carbon dioxide is supplied to an ethylene oxide absorber. Preferably a first gas composition comprising ethylene oxide, ethylene, oxygen, carbon dioxide and water vapor is supplied to an ethylene oxide absorber. An absorbent is also supplied to the ethylene oxide absorber; this absorbent is a lean absorbent. The lean absorbent is lean towards ethylene oxide. The lean absorbent is capable of absorbing ethylene oxide. The lean absorbent preferably is liquid. The lean absorbent comprises at least 5 wt % water, and preferably less than 80 wt % water. The ethylene oxide absorber may also be referred to as a reactive absorber. In the ethylene oxide absorber, or reactive absorber, a reactive absorption process takes place. This reactive absorption process takes place in the presence of one or more catalysts, preferably one or more catalysts that promote carboxylation and hydrolysis.

As indicated in the reactions shown above, various reactions may take place in the ethylene oxide absorber. Ethylene oxide may be directly converted to the desired ethylene glycol by reaction with water. Ethylene oxide may react with carbon dioxide to form ethylene carbonate. At least part of the formed ethylene carbonate may react with water to form carbon dioxide and the desired ethylene glycol. Additionally, diethylene glycol may be formed, for example by reaction of ethylene oxide with ethylene glycol.

An absorbent stream may be removed from the ethylene oxide absorber, also referred to as reactive absorber. This absorbent stream comprises ethylene glycol and ethylene carbonate. The absorbent stream that may be removed from the reactive absorber is also referred to as fat absorbent stream. The fat absorbent stream is fat towards ethylene oxide reaction products. The fat absorbent stream is fat towards ethylene glycol and ethylene carbonate. The fat absorbent preferably is liquid. A second gas composition may be removed from the top of the reactive absorber. The second gas composition comprises carbon dioxide. The second gas composition may also be referred to as reactive absorber off gas.

The fat absorbent stream comprising ethylene glycol and ethylene carbonate may be fed to a hydrolyser. In the hydrolyser ethylene carbonate may be converted to ethylene glycol.

The present invention provides optimal operating conditions of an ethylene absorber, or reactive absorber.

As described above, a first gas composition is allowed to pass upwards through the absorption section of vertically stacked trays, and a lean absorbent is allowed to pass downwards. A second gas composition is withdrawn from the top of the absorber.

It was found that a higher ethylene oxide concentration in the first gas composition results in higher monoethylene glycol production in the reactive absorber, and less ethylene oxide leakage to the second gas composition and to the reactive absorber bottoms.

It was further found that a higher carbon dioxide concentration in the reactive absorber, as shown by a higher carbon dioxide concentration in the second gas composition, results in a reduction of ethylene oxide in the second gas composition (reactive absorber off gas), a reduction of acetaldehyde in the second gas composition, and a reduction of diethylene glycol selectivity in favor of an improved monoethylene glycol selectivity.

And it was found that a higher temperature of the first gas composition supplied to the reactive absorber results in a reduction of ethylene oxide leakage to the second gas composition (absorber off gas).

It was found that optimal operation of the reactive absorber may be obtained with the following combination of conditions for ethylene glycol preparation: a first gas composition comprising at least 1 mol %, preferably 1 to 7 mol %, of ethylene oxide, a second gas composition comprising at least 1 mol %, preferably from 1 to 10 mol %, of carbon dioxide, and a temperature of the first gas composition of at least 60° C. preferably from 60° C. to 160° C.

In a pilot plant optimal operation of the reactive absorber was achieved with a reduced concentration of ethylene oxide in the second gas composition (reactive absorber off gas), reduced production of acetaldehyde byproduct, increased selectivity to monoethylene glycol, and reduced production of ethylene glycol oligomers.

In the present invention, the gas composition comprising ethylene oxide and carbon dioxide preferably is derived from the reactor product of an ethylene oxide reactor, in which ethylene is reacted with oxygen in the presence of a catalyst in a reactor to form ethylene oxide. More preferably the gas composition comprises ethylene oxide, ethylene, oxygen, carbon dioxide and water vapor and preferably is derived from the reactor product of an ethylene oxide reactor, in which ethylene is reacted with oxygen in the presence of a catalyst in a reactor to form ethylene oxide. In such a reaction, the oxygen may be supplied as oxygen or as air but is preferably supplied as oxygen. Ballast gas, for example methane or nitrogen, is typically supplied to allow operation at high oxygen levels without causing a flammable mixture. A moderator, e.g. monochloroethane, dichloroethane, or vinyl chloride may be supplied for ethylene oxide catalyst performance control. The ethylene, oxygen, ballast gas and moderator are preferably supplied to recycle gas that is supplied to the ethylene oxide reactor from the ethylene oxide absorber (optionally via a carbon dioxide absorption column).

The ethylene oxide reactor is typically a multi-tubular, fixed bed reactor. The catalyst is preferably finely dispersed silver and optionally promoter metals on a support material, for example, alumina. The reaction is preferably carried out at pressures of greater than 1 MPa and less than 3 MPa and temperatures of greater than 200° C. and less than 300° C. The gas composition from the ethylene oxide reactor is preferably cooled in one or more coolers, preferably with generation of steam at one or more temperature levels.

The gas composition comprising ethylene oxide, ethylene, oxygen, carbon dioxide and water vapor is supplied to an ethylene oxide absorber comprising an absorption section of vertically stacked trays. The trays provide a surface area for the absorbent and gas composition to come into contact, facilitating mass transfer between the two phases. Additionally, trays provide considerable liquid volume in which the liquid phase reaction can occur.

A tray generally comprises a perforated gas-liquid contacting member or members for effecting intimate contact between a gas rising through the tray and a liquid flowing across the surface of the tray across the perforated member. The perforated gas-liquid contacting member is in some instances provided with bubble caps or valves. At one edge of the contacting member of the tray is a liquid inlet area for receiving the liquid onto the tray. This area will generally contain no perforations. At the opposite edge of the contacting member is the liquid discharge area of the tray, which is provided with an outlet weir member extending vertically above the surface of the tray. The flowing liquid overflows the outlet weir for discharge from the tray. Accordingly, this outlet weir, maintains a given liquid depth on the tray. Extending below the trays is one or more downcomer elements which, provide for the passage of liquid downwardly from the liquid discharge region to the liquid inlet region of the vertically adjacent tray directly below. The downcomer may be formed in cooperation with the inner surface of the wall of the column or tower or the downcomer may be formed by a self-contained box located away from the wall of the column, where the top of the box forms the weir. In embodiments of the invention wherein the absorption section is of a large size, there may be more than one liquid inlet area, more than one outlet weir and more than one downcomer element per tray.

The downwardly flowing liquid received on the liquid inlet area then flows across the surface of this tray in a path across the perforated gas-liquid contacting member, to the liquid discharge area and is discharged from the tray, over the outlet weir into the next downcomer.

A gas flows upwardly in the column through the perforations of the gas-liquid contacting members of the trays, allowing intimate contact with the liquid flowing horizontally across the surface of the tray. The gas is prevented from passing up the downcomers, as the downcomer element also functions as a baffle extending below the surface level of the flowing liquid to seal the downcomers from gas bypass. However, gas bypassing through downcomers may occur during startup of the process, when the column is not yet sufficiently filled with liquid.

In a preferred embodiment of the invention, each of the outlet weirs is provided with one or more apertures positioned below the upper edge of the outlet weir and in a position or positions that would be completely below the surface of the lean absorbent on the tray during normal operation. Preferably, the apertures are present in the bottom half of each outlet weir. Normal operation is defined herein as operation wherein the trays are all full and at least 90% of the liquid flowing down through the column is flowing over the weir rather than through the apertures. In this embodiment, the apertures are designed such that during normal operation less than 10% of the total liquid flow is passing through the apertures. Preferably no more than 20%, more preferably no more than 10%, even more preferably no more than 5%, most preferably no more than 2%, of the surface area of each outlet weir is taken up with the one or more apertures.

The reaction speed of the reactive absorption process for the conversion of ethylene oxide to ethylene glycol is relatively slow and, therefore, requires a large liquid hold up within the absorption section. The outlet weir on each tray is at least 200 mm, preferably at least 250 mm, more preferably at least 350 mm, even more preferably at least 400 mm, yet even more preferably at least 500 mm, and most preferably at least 600 mm in height. The outlet weirs are at most 1500 mm in height, preferably at most 1000 mm, more preferably at most 800 mm in height.

The distance between two consecutive trays in a column is termed the plate spacing. The vapor space, space between the top of a weir and the tray directly above it, can be calculated as the plate spacing minus the weir height and is preferably at least 150 mm, more preferably at least 200 mm and most preferably at least 400 mm. The vapor space is preferably no more than 1000 mm, more preferably no more than 500 mm.

The gas composition is supplied through a gas inlet below the absorption section and passes upwards through the trays. Liquid lean absorbent is supplied at or near the top of the absorber and the liquid flows downwards from tray to tray. The lean absorbent is preferably supplied to the uppermost tray in the absorption section. In another embodiment, the lean absorbent is supplied such that there are trays above the point at which the lean absorbent is supplied to the ethylene oxide absorber. In this embodiment, cold water or additional lean absorbent that has been cooled may be supplied at the top of the ethylene oxide absorber to absorb ethylene oxide or volatile byproducts in the top of the ethylene oxide absorber.

The number of trays present in the absorption section will be dependent on the weir height and the amount of liquid hold up required in the absorption section. Preferably, the absorption section comprises at least 20 trays, more preferably at least 30 trays. Preferably the absorption section comprises less than 100 trays, more preferably less than 70 trays, most preferably less than 50 trays. More trays increase the absorption ability and reaction volume of the absorption section for any given weir height, but adding additional trays increases the size of the absorption section and therefore increases the expense involved in building and running it.

The gas composition is intimately contacted with lean absorbent on the trays in the ethylene oxide absorber in the presence of one or more catalysts that promote carboxylation and hydrolysis. If this occurs in the presence of only one catalyst, then the catalyst must promote carboxylation and hydrolysis. If this occurs in the presence of two or more catalysts, then each catalyst can promote carboxylation or hydrolysis or can promote both reactions (provided that at least one catalyst promotes carboxylation and at least one catalyst promotes hydrolysis). In a preferred embodiment the gas composition is contacted with lean absorbent in the presence of at least two catalysts including a first catalyst that promotes carboxylation and a second catalyst that promotes hydrolysis.

In one embodiment of the invention, the one or more catalysts that promote carboxylation and hydrolysis is/are homogeneous, and the lean absorbent comprises the one or more catalysts. In one embodiment, the homogenous catalyst system comprises an iodide compound. Homogeneous catalysts that are known to promote carboxylation include alkali metal halides such as potassium iodide and potassium bromide, and halogenated organic phosphonium or ammonium salts such as tributylmethylphosphonium iodide, tetrabutylphosphonium iodide, triphenylmethylphosphonium iodide, triphenylpropylphosphonium bromide, triphenylbenzylphosphonium chloride, tetraethylammonium bromide, tetramethylammonium bromide, benzyltriethylammonium bromide, tetrabutylammonium bromide and tributylmethylammonium iodide. Homogeneous catalysts that are known to promote hydrolysis include basic alkali metal salts such as potassium carbonate, potassium hydroxide and potassium bicarbonate, or alkali metal metallates such as potassium molybdate. Preferred homogeneous catalyst systems include a combination of potassium iodide and potassium carbonate, and a combination of potassium iodide and potassium molybdate.

In one embodiment, a fixed ratio of the water recycle stream and the catalyst recycle stream is assumed, which determines the inlet concentration of the lean absorbent stream. The residence time of the absorbent is affected by the amount of lean absorbent fed to the absorber. In one embodiment, the amount of lean absorbent added to the absorber is less than 0.46 kg of lean absorbent feed per total kg of gas feed, preferably in the range of from 0.16 to 0.46 kg of lean absorbent feed per total kg of gas feed.

In another embodiment, the amount of iodide catalyst in the absorbent feed stream is at least 7.5 wt %, and preferably in the range of from 7.5 to 15 wt %.

In another embodiment of the invention, the one or more catalysts that promote carboxylation and hydrolysis is/are heterogeneous and the heterogeneous catalyst(s) are contained in the vertically stacked trays. Heterogeneous catalysts that promote carboxylation include quaternary ammonium and quaternary phosphonium halides immobilized on silica, quaternary ammonium and quaternary phosphonium halides bound to insoluble polystyrene beads, and metal salts such as zinc salts immobilized on solid supports containing quaternary ammonium or quaternary phosphonium groups, such as ion exchange resins containing quaternary ammonium or quaternary phosphonium groups. Heterogeneous catalysts that promote hydrolysis include metallates immobilized on solid supports, for example molybdates, vanadates or tungstates immobilized on ion exchange resins containing quaternary ammonium or quaternary phosphonium groups, or basic anions such as bicarbonate ions immobilized on solid supports, for example bicarbonate immobilized on ion exchange resins containing quaternary ammonium or quaternary phosphonium groups.

In the embodiment where the gas composition is contacted with lean absorbent in the presence of at least two catalysts including a first catalyst that promotes carboxylation and a second catalyst that promotes hydrolysis, the ratio of first catalyst to second catalyst can be adjusted in order to vary the amount of carbon dioxide that is consumed or released in the ethylene oxide absorber. Preferably the gases from the ethylene oxide absorber are partially or entirely supplied to a carbon dioxide absorption column wherein the carbon dioxide is at least partially absorbed by a recirculating absorbent stream. By controlling the amount of carbon dioxide that is consumed or released in the ethylene oxide absorber, the capacity and cost of a carbon dioxide absorber column can be reduced.

The optimal operation of the reactive absorber provides reduced concentration of ethylene oxide in the absorber off gas, reduced production of acetaldehyde byproduct, increased selectivity to monoethylene glycol, and reduced production of ethylene glycol oligomers.

The main function of the absorber is to absorb and react the ethylene oxide, so it is preferred to operate the absorber to increase the conversion of ethylene oxide and thereby reduce the concentration of ethylene oxide in the off gas. Increased amounts of ethylene oxide in the off gas also negatively impact the performance of downstream process steps in the gas loop. For example, the guard bed that is used to remove iodides from the ethylene before recycling to the ethylene oxide reactor will have a reduced capacity due to the increased amount of ethylene oxide. If the ethylene oxide reaches the carbon dioxide system, this can result in monoethylene glycol and glycolic acid forming in that system which can prompt more frequent solution change outs.

Monoethylene glycol is the desired product from this process, so operating conditions that increase the selectivity to monoethylene glycol are preferred. In some embodiments, sufficient amounts of diethylene glycol are produced such that it can be separated and sold as a separate product, but production of heavier glycols is not preferred and should be limited as much as possible.

In the absorber, a small amount of the ethylene oxide may isomerize to acetaldehyde instead of reacting to form ethylene carbonate. This reduces the overall yield of the process to monoethylene glycol and operating conditions which limit the isomerization of ethylene oxide to acetaldehyde are preferred. Ethylene glycol oligomers may also form in the absorber and these can cause foaming in the absorber which can result in a temporary shutdown of the plant or the need to replace the catalyst in the absorber.

There are a number of operating conditions that can be effectively adjusted to provide for optimal operation of the absorber including the concentrations of ethylene oxide and carbon dioxide in the feed gas, catalyst and water concentrations in the lean absorbent, the temperatures of the feed gas and lean absorbent, and the pressure in the absorber.

The concentration of ethylene oxide in the feed gas to the absorber has an impact on the operation of the reactive absorber. A higher EO concentration allows the EO absorber to produce MEG at higher production rates with less EO leakage. The feed gas comprises at least 1 mol % of ethylene oxide. The feed gas comprises from 1 to 7 mol % of ethylene oxide, preferably from 1 to 5 mol % of ethylene oxide and most preferably from 2 to 4 mol % of ethylene oxide.

Preferably the lean absorbent is a liquid mixture consisting of water, glycol and catalyst. The lean absorbent preferably is the result of mixing a water recycle stream and catalyst recycle stream containing the catalyst and glycol. The lean absorbent comprises at least 5 wt % water. The water that is present in the lean absorbent is used in the hydrolysis of ethylene oxide and ethylene carbonate that occurs in the ethylene oxide absorber. Preferably, the lean absorbent comprises at least 10 wt % water, more preferably at least 15 wt % water, most preferably at least 20 wt % water. Preferably the lean absorbent comprises less than 80 wt % water, more preferably no more than 50 wt % water, even more preferably no more than 30 wt % water. In another embodiment, the amount of water may be measured as the ratio of water feed rate to gas feed rate. The ratio is preferably between 0 and 0.15 kg water in liquid feed per kg of gas feed. The ratio may also be between 0.01 and 0.15 kg water in liquid feed per kg of gas feed. Higher levels of water in the lean absorbent dilute any catalytic species which leads to a reduction in the net ethylene oxide conversion rate. Since that conversion is exothermic, a reduction in the conversion rate results in a lower temperature in the column, less evaporation of water and increased EO leakage to the off gas. The lean absorbent may also comprise ethylene glycol.

The temperature in the ethylene oxide absorber may be from 50 to 160° C., preferably from 60 to 160° C., more preferably 80 to 150° C., more preferably from 80 to 120° C. This is higher than the temperature in an absorber in a conventional process and increases the carboxylation and hydrolysis reaction rates. Temperatures higher than 160° C. are not preferred as this may reduce the yield of the ethylene oxide conversion to ethylene glycol.

The first gas composition comprising ethylene oxide, ethylene, oxygen, carbon dioxide and water vapor preferably is supplied to the ethylene oxide absorber at temperatures in the range from 50° C. to 160° C., more preferably 60 to 160° C. The lean absorbent preferably is supplied to the ethylene oxide absorber at temperatures in the range from 50° C. to 160° C., more preferably 60 to 160° C. Preferably both the gas composition comprising ethylene oxide, ethylene, oxygen, carbon dioxide and water vapor and the lean absorbent are supplied to the ethylene oxide absorber at temperatures in the range from 50° C. to 160° C., preferably from 60 to 160° C.

The operation of the absorber may be improved by feeding the feed gas, i.e. the first gas composition, at specific temperatures. The temperature of the feed gas preferably is from 60 to 120° C. The temperature of the feed gas is more preferably from 60 to 100° C., even more preferably from 70 to 100° C.

The operation of the absorber may be improved by feeding the lean absorbent at specific temperatures. The feed temperature of the lean absorbent is at least 65° C. The lean absorbent feed temperature is preferably in a range of from 65 to 150° C., more preferably in a range of from 75 to 125° C. and most preferably in a range of from 85 to 120° C.

The pressure in the ethylene oxide absorber is from 1 to 4 MPa, preferably from 1.5 to 3 MPa, and more preferably in the range of from 1.5 to 2.5 MPa. The preferred pressure is a compromise between lower pressures that require less expensive equipment (e.g. equipment having thinner walls) and higher pressures that increase absorption and reduce the volumetric flow of the gas, thereby reducing the size of equipment and piping.

At least 50% of the ethylene oxide entering the ethylene oxide absorber is converted in the ethylene oxide absorber. Preferably at least 60%, more preferably at least 70%, even more preferably at least 80%, most preferably at least 90% of the ethylene oxide entering the ethylene oxide absorber is converted in the ethylene oxide absorber. The ethylene oxide may undergo carboxylation, providing ethylene carbonate. The ethylene oxide may undergo hydrolysis, providing ethylene glycol. Additionally, the ethylene carbonate that is produced from the ethylene oxide may undergo hydrolysis, providing ethylene glycol.

Preferably, in the present invention, the ethylene oxide absorber forms part of a reaction system and process for the production, isolation and purification of ethylene glycol from ethylene via the corresponding ethylene oxide such as those described in EP 2178815 and similar. It will readily be understood that the absorber will be integrated into such a system which will contain a number of reactor vessels, columns and recycle streams.

The gas composition supplied to the ethylene oxide absorber comprises ethylene oxide, ethylene, oxygen, carbon dioxide and water vapor. It is possible that the gas composition may contain insufficient carbon dioxide to achieve desired levels of carboxylation and reduce byproduct formation. An additional source of carbon dioxide is preferably supplied to the ethylene oxide absorber, e.g. recycle carbon dioxide from a finishing reactor (a reactor used to complete the conversion to ethylene glycols), carbon dioxide from a carbon dioxide recovery unit or, carbon dioxide from an external source. The molar ratio of the total amount of carbon dioxide supplied to the ethylene oxide absorber to the amount of ethylene oxide supplied to the ethylene oxide absorber is preferably between 5:1 and 1:3, more preferably between 3:1 and 4:5. A higher quantity of carbon dioxide improves the selectivity of the process because most ethylene oxide reacts with carbon dioxide to ethylene carbonate, which is subsequently hydrolysed to ethylene glycol and there is less opportunity for reaction between ethylene oxide and ethylene glycol to produce higher glycols and less isomerization to acetaldehyde. However, a higher quantity of carbon dioxide may also require additional removal capacity for carbon dioxide in the process and is costly. Alternatively, operating a connected ethylene oxide reactor with a recycled gas stream containing the excess carbon dioxide may adversely affect the catalyst performance if not removed in the carbon dioxide recovery unit.

The carbon dioxide in the column can be monitored by measuring the amount of carbon dioxide in the off gas. The carbon dioxide concentration in the off gas is preferably measured after the off gas is cooled. The off gas preferably comprises at least 1 mol % carbon dioxide. The off gas preferably comprises from 1 to 5 mol % carbon dioxide, more preferably from 1 to 3.5 mol % carbon dioxide and most preferably from 1.5 to 2.4 mol % carbon dioxide. The off gas preferably comprises less than 100 ppmv ethylene oxide and more preferably less than 10 ppmv ethylene oxide.

Gases that are not absorbed in the ethylene oxide absorber are preferably partially or entirely supplied to a carbon dioxide absorption column wherein the carbon dioxide is at least partially absorbed by a recirculating absorbent stream. Gases that are not absorbed by the recirculating absorbent stream are preferably recombined with any gases bypassing the carbon dioxide absorption column and are recycled to the ethylene oxide reactor. Preferably the gases are cooled prior to recycle to the ethylene oxide reactor to reduce the water content. The water removed from the EO absorber off gas stream can optionally be recirculated to the ethylene oxide absorber, and water that is removed from the off gas of the carbon dioxide absorption column can be recycled to the carbon dioxide unit. The performance of the catalyst in the ethylene oxide reactor may be detrimentally affected by an excess of water.

The reactive absorber catalyst may be recycled to the reactive absorber by passing it to the absorber with the lean absorbent feed stream.

If the one or more catalysts that promote carboxylation and hydrolysis include a halogen-containing catalyst (e.g. an alkali metal halide, a halogenated organic phosphonium or ammonium salt or a quaternary ammonium or quaternary phosphonium halide immobilized on a solid support), then gases that are recycled from the ethylene oxide absorber to the ethylene oxide reactor may comprise halide-containing impurities such as iodide-containing impurities or bromide-containing impurities. It is possible that the catalyst in the ethylene oxide reactor may be detrimentally affected by these impurities. Therefore, in this embodiment it is preferred that gases that are recycled from the ethylene oxide absorber to the ethylene oxide reactor are contacted with one or more purification adsorbents capable of reducing the quantity of halide-containing impurities (especially iodide-containing impurities or bromide-containing impurities) prior to contacting the catalyst in the ethylene oxide reactor. The one or more purification adsorbent may be located within the reactor tubes of the ethylene oxide reactor, within the ethylene oxide reactor upstream from the reactor tubes or separately upstream from the ethylene oxide reactor.

The fat absorbent at the bottom of the absorption section may still contain quantities of unreacted ethylene oxide. The fat absorbent may contain up to 5 wt % ethylene oxide or up to 2 wt % ethylene oxide. The fat absorbent is collected from the absorption section and passed through the sump of the absorber. The unreacted ethylene oxide is preferably converted to ethylene carbonate or ethylene glycol in the sump of the EO absorber before it is removed from the absorber. The fat absorbent, after passing through the sump, is passed via the sump outlet.

The fat absorbent exiting the sump outlet contains less than 100 ppmw ethylene oxide, preferably less than 50 ppmw ethylene oxide and more preferably less than 10 ppmw ethylene oxide. The fat absorbent is sent from the absorber to a hydrolyser, which operates at a lower pressure and higher temperature than the absorber.

In one embodiment of the invention, at least a portion of the fat absorbent is supplied to one or more finishing reactors. The finishing reactors may include reactors suitable for carboxylation, hydrolysis or hydrolysis and carboxylation. The temperature in the one or more finishing reactors is typically from 100 to 200° C., preferably from 100 to 180° C. The pressure in the one or more finishing reactors is typically from 0.1 to 3 MPa.

In another embodiment, a heater may be located between the absorber and the one or more finishing reactors. The fat absorbent is passed through the heater to heat the stream to a temperature in the range of from 130 to 170° C. Due to the higher temperatures in the heater, any remaining ethylene oxide should be converted to ethylene carbonate or ethylene glycol. In upset conditions, there is a possibility of additional ethylene oxide in the fat absorbent that would be converted in this heater. Any unreacted ethylene oxide that reaches downstream sections of the process will flash and not react efficiently.

The fat absorbent is converted through the optional heaters or finishing reactors into a hydrolysis product stream.

Carbon dioxide may be produced in the one or more finishing reactors or the preheater and is preferably separated from the product stream as it leaves the one or more finishing reactors and is optionally recycled to the reactive absorber.

The hydrolysis product stream comprising ethylene glycol is supplied to a dehydrator. The stream that is supplied to the dehydrator preferably comprises very little ethylene oxide or ethylene carbonate, i.e. most of the ethylene oxide or ethylene carbonate has been converted to ethylene glycol prior to supply to the dehydrator column, either in the ethylene oxide absorber, in a preheater or in a finishing reactor. Preferably, the amount of ethylene carbonate in the ethylene glycol stream supplied to the dehydrator column is less than 100 ppm, preferably less than 50 ppm, and more preferably less than 10 ppm.

The dehydrator is preferably one or more columns, including at least one vacuum column, preferably operating at a pressure of less than 0.05 MPa, more preferably less than 0.025 MPa and most preferably about 0.0125 MPa.

The dehydrated product stream is purified to remove impurities and provide a purified ethylene glycol product stream. If the one or more catalysts are homogeneous catalysts, it will be necessary to separate the one or more catalysts from the dehydrated product stream, preferably in a flash vessel or bottom section of the MEG purification column. The one or more homogeneous catalysts remain with the catalyst recycle which is supplied to the ethylene oxide absorber.

Figure 12:
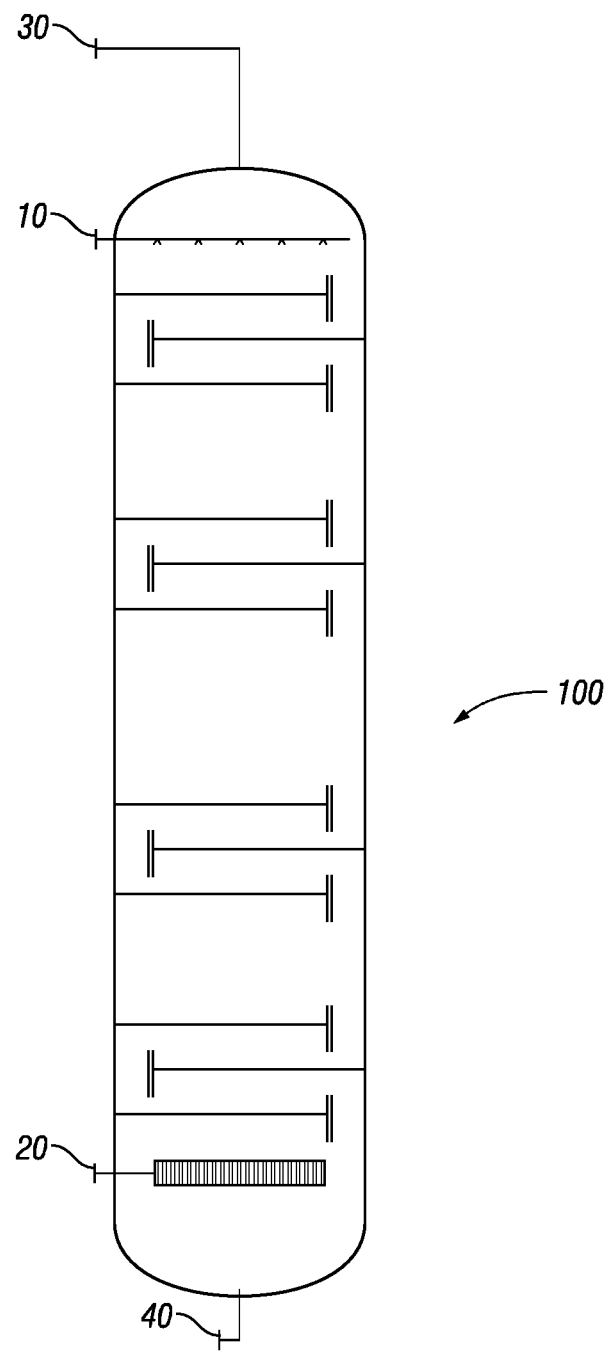
FIG. 12 depicts an embodiment of a reactive absorber.

FIG. 12 depicts an embodiment of the reactive absorber 100. The absorber 100 has an inlet 20 for feed gas, an inlet 10 for lean absorbent, an outlet 30 for gas, and an outlet 40 for fat absorbent. The reactive absorber comprises a number of trays, preferably having high weirs to provide sufficient liquid holdup. The fat absorbent may be passed through a sump that has an increased residence time to provide for further reaction of the ethylene oxide.

EXAMPLES

The below example results are from pilot plant operating data and a predictive model derived from the pilot plant data. The following absorber operating conditions are varied in these examples: $CO_2$ concentration in the off gas, EO concentration in the feed gas (via the EO concentration in the EO Reactor product), gas feed temperature, lean absorbent feed temperature, water feed rate/gas feed rate ratio, lean absorbent feed rate/gas feed rate ratio, and iodide concentration in the lean absorbent feed. The lean absorbent is a liquid mixture consisting of water, glycol and catalyst. The lean absorbent is the result of mixing a water recycle stream and catalyst recycle stream containing the catalyst and glycol.

Example 1

The pilot plant was operated at five different carbon dioxide concentrations while keeping all other operating conditions constant to measure the effect of carbon dioxide on the reactive EO absorber. Table 1 shows the effects of operating under those conditions for 1-B through 1-F. The data for 1-A and 1-G was generated by extrapolating the pilot plant data. The $CO_2$ concentration in the off gas from the absorber was measured after it was cooled to remove water. Acetaldehyde (ACAL) forms as a byproduct in the absorber which causes an overall yield loss of the process. The amount of acetaldehyde is also shown as measured in the off gas after condensation of water.

TABLE 1

| Property | Units | 1-A | 1-B | 1-C | 1-D | 1-E | 1-F | 1-G |
|---|---|---|---|---|---|---|---|---|
| $CO_2$ in off gas | mol % | 1.0 | 1.25 | 1.5 | 1.8 | 2.1 | 2.4 | 3.5 |
| EO in off gas | ppmv | 48.5 | 28 | 15 | 7.9 | 0 | 0 | 0 |
| ACAL in off gas | ppmv | 410 | 361 | 291 | 254 | 223 | 217 | 153 |
| MEG selectivity | % | 98.18 | 98.29 | 98.56 | 98.63 | 98.72 | 98.81 | 99.10 |
| DEG selectivity | % | 1.82 | 1.71 | 1.44 | 1.37 | 1.28 | 1.19 | 0.90 |

The following observations are made from the data in Table 1. A higher $CO_2$ concentration in the absorber column (as shown by a higher $CO_2$ concentration in the absorber off gas) results in a reduction of EO in the absorber off gas, a reduction of acetaldehyde in the absorber off gas, and a reduction of DEG selectivity in favor of an improved MEG selectivity. It is believed that the higher $CO_2$ concentration results in EO preferentially undergoing carboxylation to EC which results in less EO left in the off gas and less EO available for isomerization to acetaldehyde or oligomerization to higher glycols. The $CO_2$ in the absorber column may be set by feeding supplemental $CO_2$ with the gas that is produced in the upstream EO reactor. The $CO_2$ may be supplemented from another source (e.g., from the $CO_2$ stripper in a $CO_2$ removal section, the hydrolyser (finishing reactor), or from $CO_2$ storage facilities.

Example 2

Figure 2:
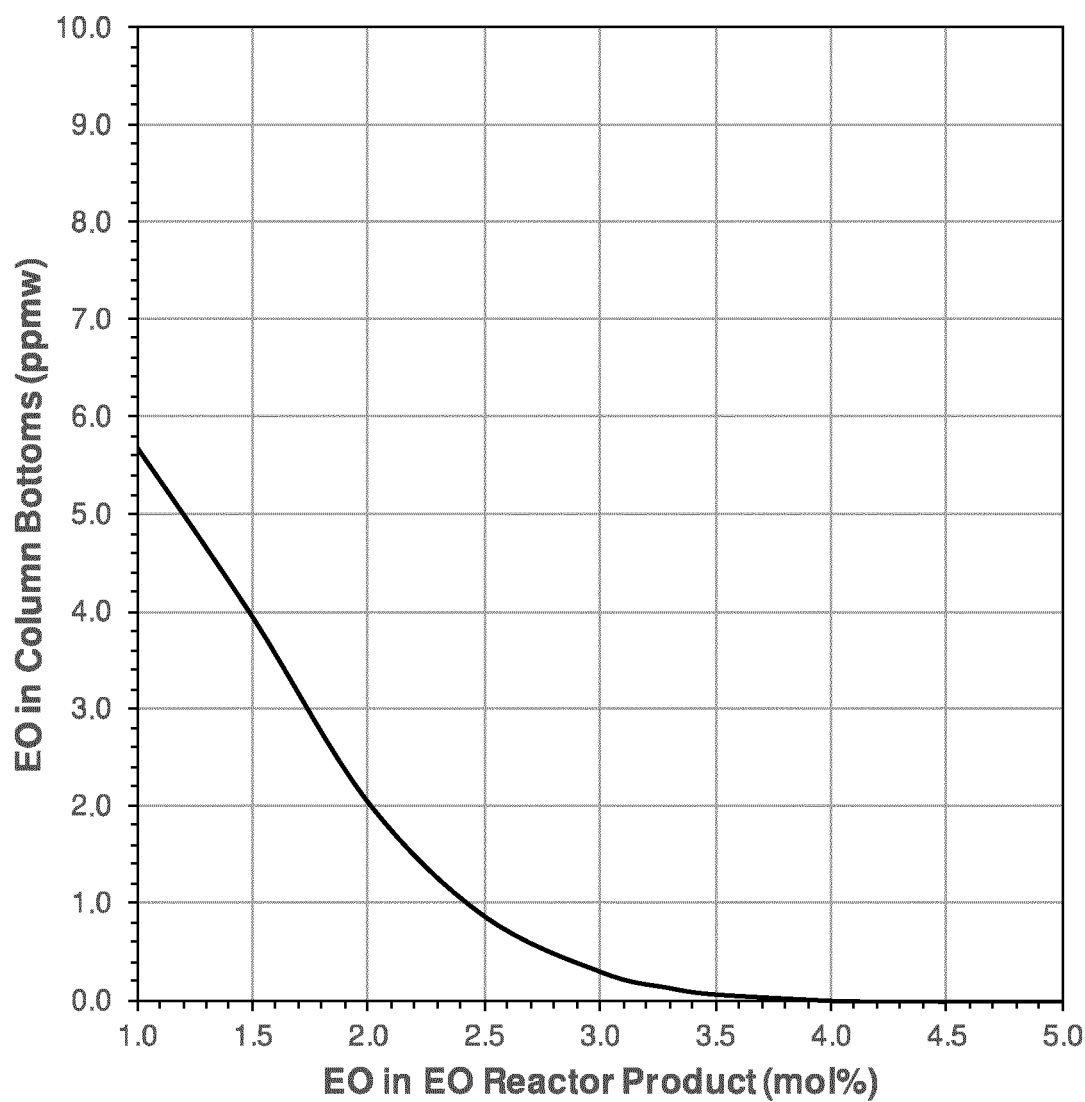
FIG. 2 depicts data from Example 2.

The pilot plant based predictive model was used to calculate the effect of EO concentration in the EO Reactor product on leakage from the absorber keeping all other operating conditions constant. FIGS. 1 and 2 show these effects across a range of EO reactor product concentrations.

The following observations are made from the trends in FIGS. 1 and 2. When EO concentration in the feed is increased the absorber produces more MEG with lower EO leakage to the column off gas and bottoms. While this contradicts the behavior of traditional absorbers, it occurs in this reactive system because the EO consumption rate increases with the increase in EO concentration and coupled increased column temperature giving an absorber with greater reaction capacity. Although EO leakage in the off gas exceeds the most preferred level of 10 ppmv for EO Reactor product concentrations below approximately 2.4 wt %, changes in combinations of other operating conditions can be used to achieve this target as shown in Example 8.

Example 3

Figure 3:
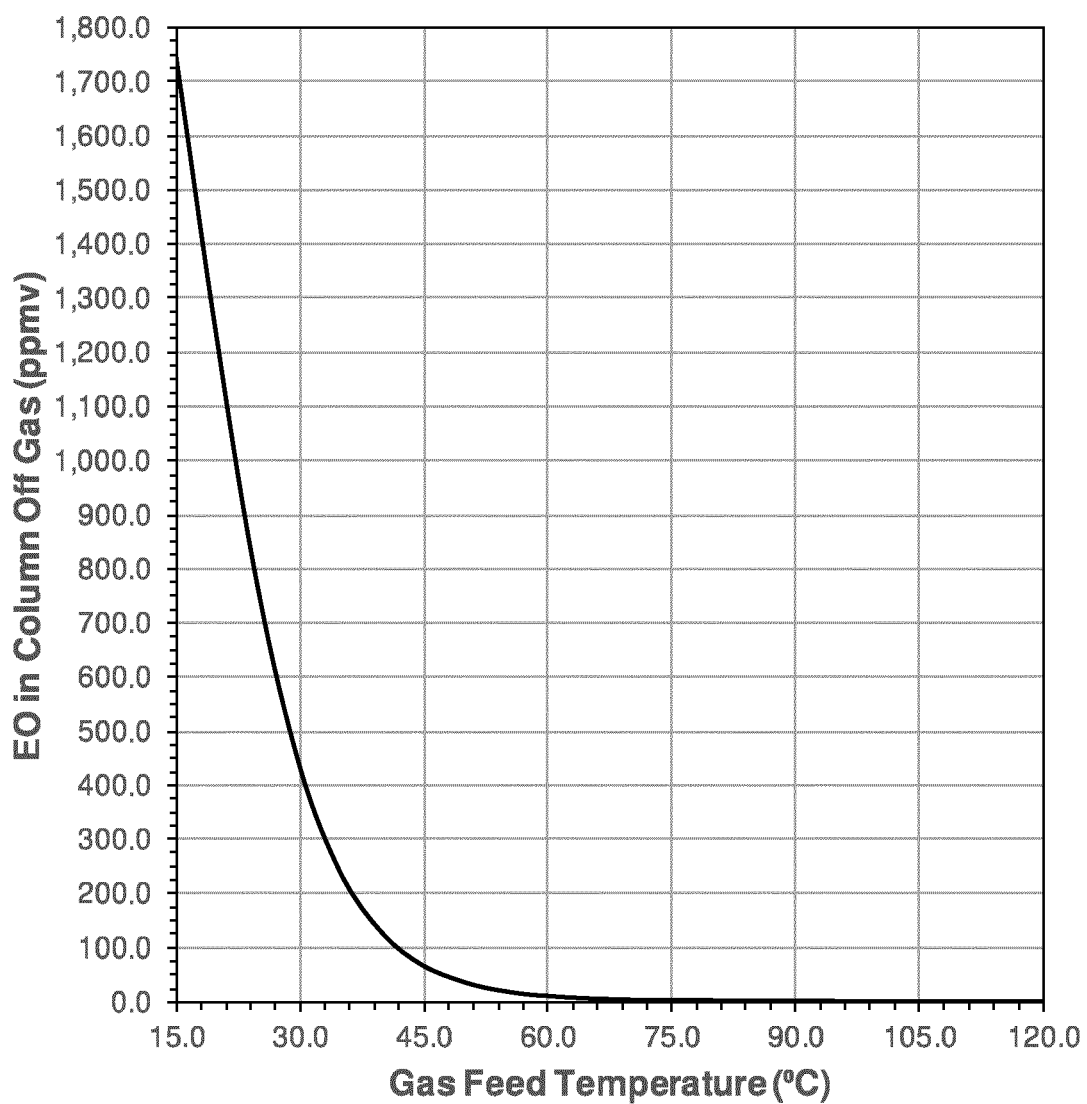
FIG. 3 depicts data from Example 3.

The predictive model was used to calculate the effect of the gas feed temperature on leakage from the absorber keeping all other operating conditions constant. FIG. 3 shows these effects across a range of gas feed temperatures.

The following observations are made from the trend in FIG. 3. The increased feed gas temperature reduces EO leakage to the column off gas. This is because the EO consumption reaction rate increases with column temperature allowing more EO to be absorbed into the liquid and subsequently reacted away like Example 2. Despite the significant impact on the off gas concentration, EO leakage in the column bottoms remains below 20 ppmw across this range.

Example 4

Figure 4:
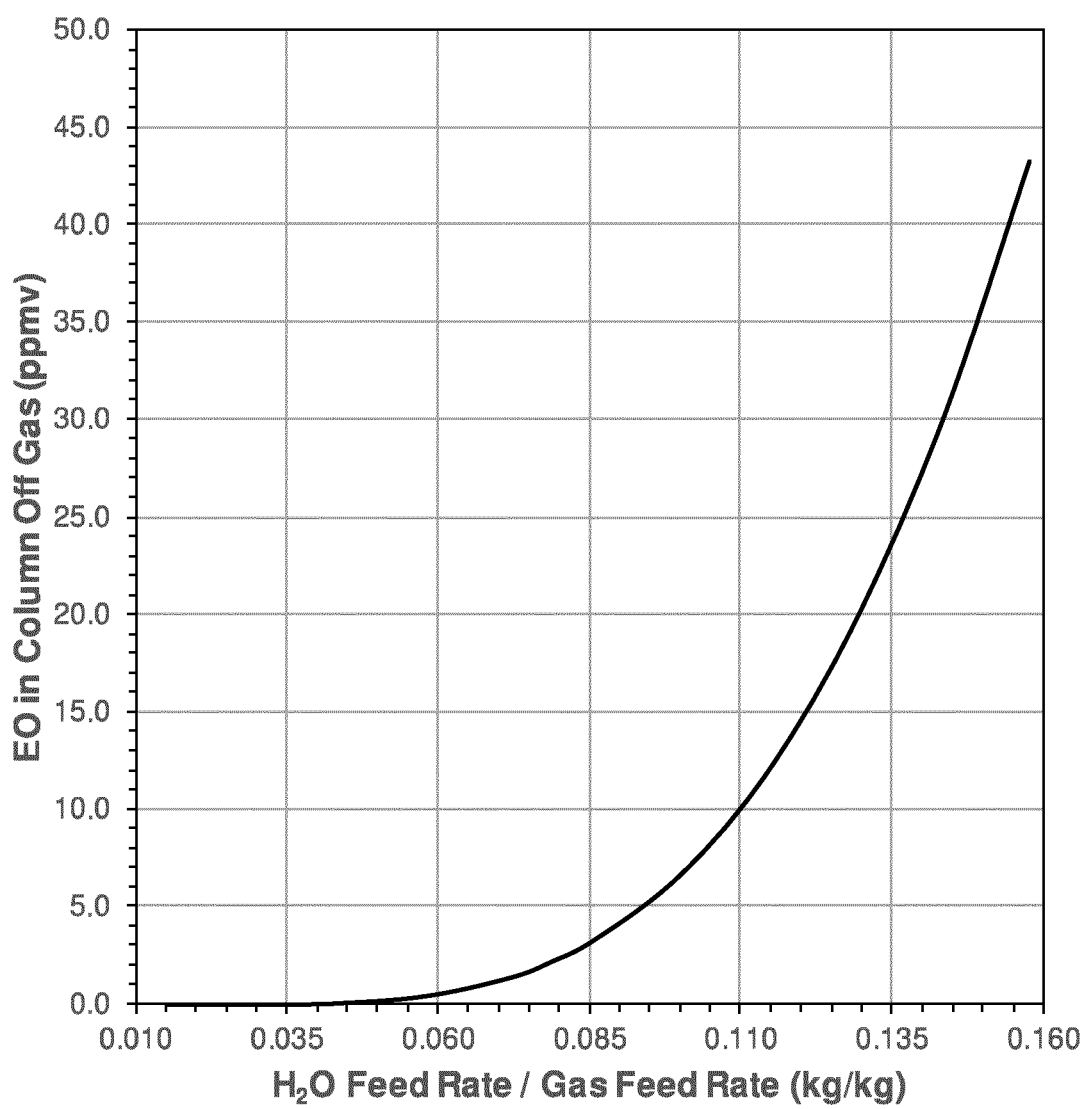
FIG. 4 depicts data from Example 4.
Figure 5:
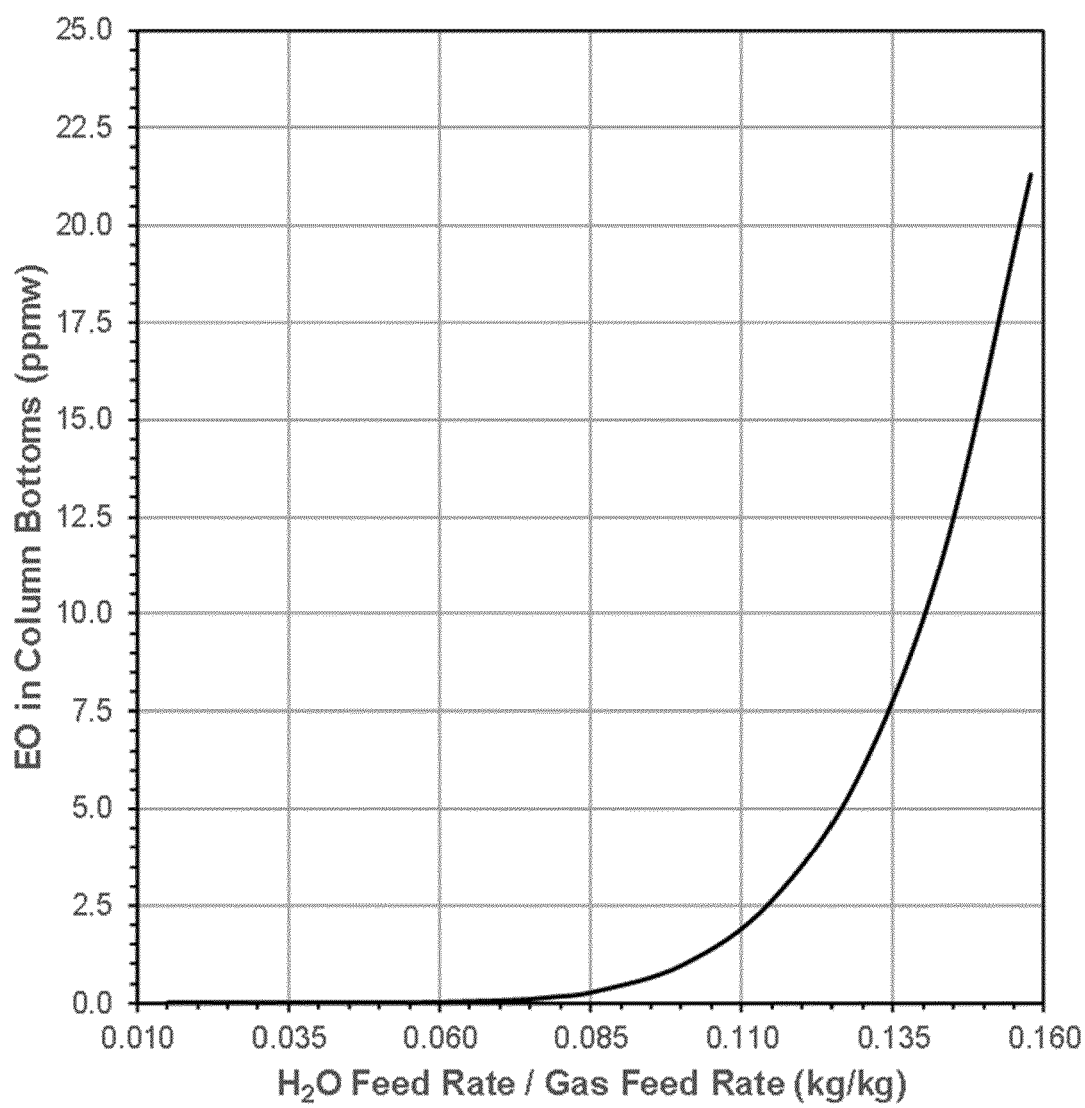
FIG. 5 depicts data from Example 4.

The predictive model was used to calculate the effect of relative water feed rate to gas feed rate on leakage from the absorber keeping all other operating conditions constant, in particular catalyst feed rate. FIGS. 4 and 5 show these effects across a range of relative water feed rates.

The following observations are made from the trends in FIGS. 4 and 5. Increasing the relative water feed rate to the gas feed rate increases EO leakage from both the columns off gas and bottoms. This is because the higher water feed rate dilutes the catalytic species in the absorbent and reduces the liquid residence time in the column. These changes both have directionally negative impacts on the EO consumption rate.

Example 5

Figure 6:
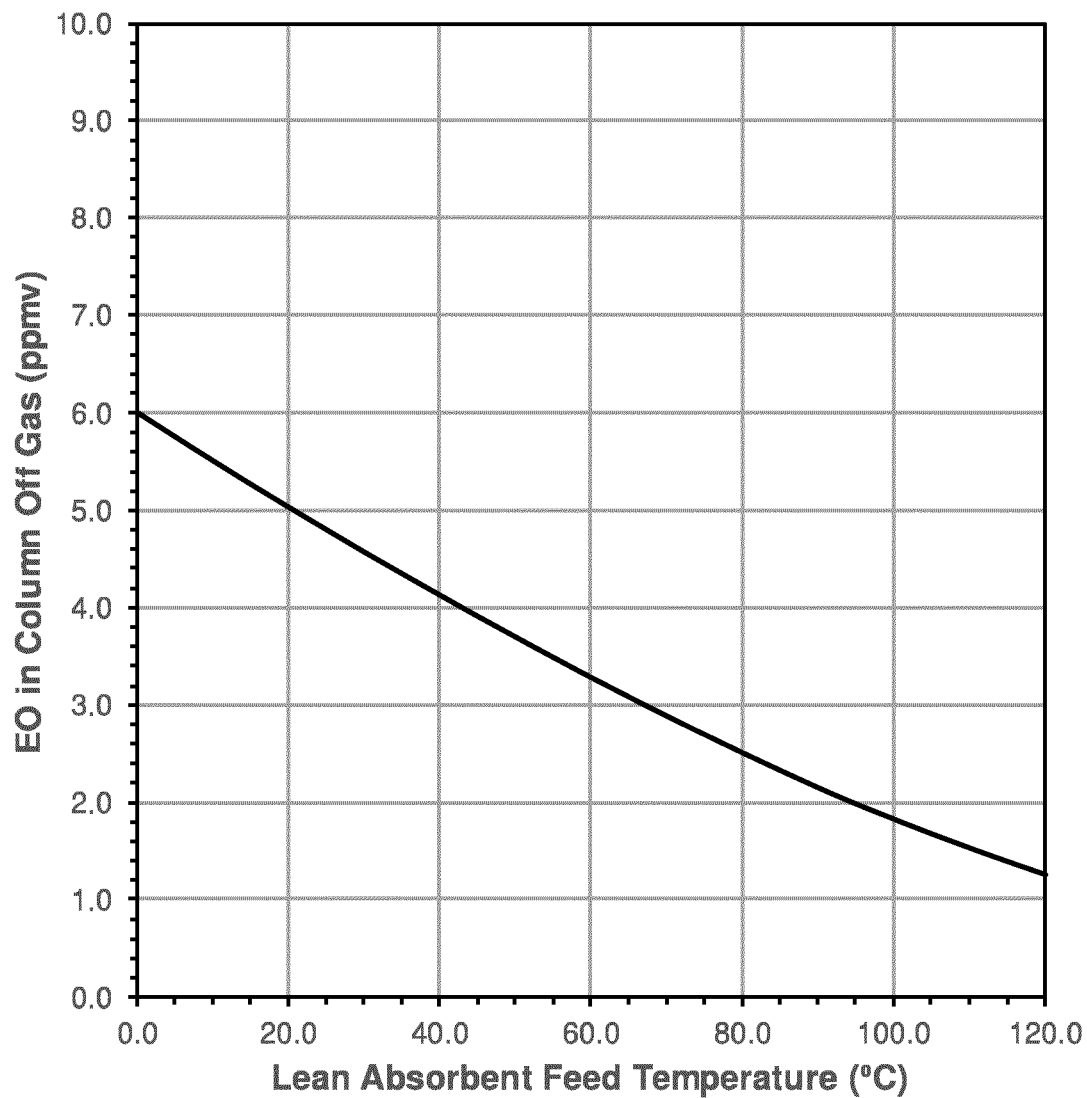
FIG. 6 depicts data from Example 5.

The predictive model was used to calculate the effect of lean absorbent feed temperature on leakage from the absorber keeping all other operating conditions constant. FIG. 6 shows these effects across a range of lean absorbent feed temperatures.

The following observations are made from the trend in FIG. 6. Increasing the lean absorbent feed temperature does give a small reduction in EO leakage in the off gas but the relative effect is less impactful than other column operating conditions. This is because the column temperature is more heavily influenced by other operating conditions such as the temperature of the much larger feed gas mass flow. The corresponding predicted leakage in the column bottoms stays below 1 ppmw across this range of lean absorbent feed temperatures.

Example 6

Figure 7:
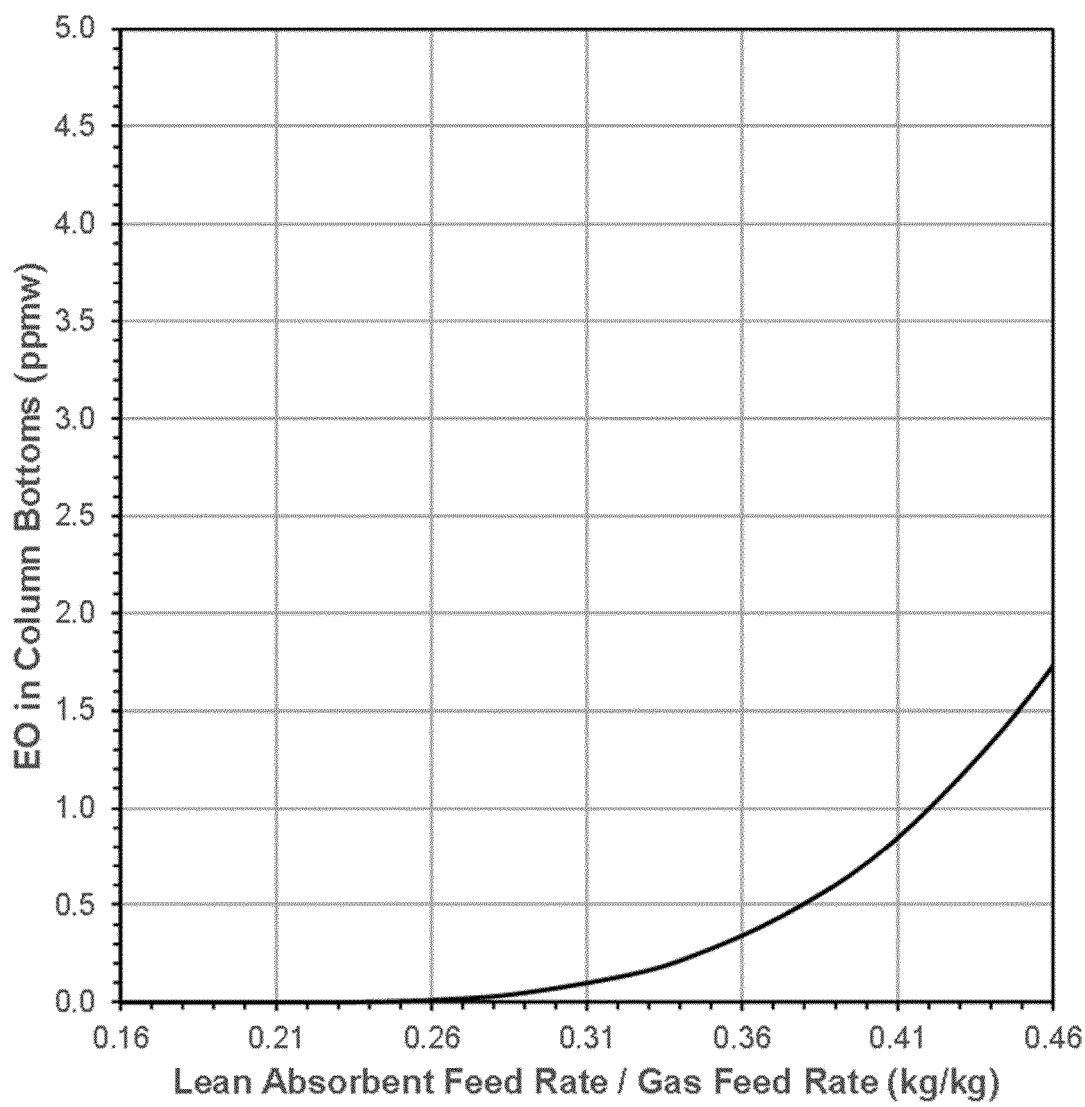
FIG. 7 depicts data from Example 6.

The predictive model was used to calculate the effect of relative lean absorbent feed rate to the gas feed rate ratio on leakage from the absorber keeping all other operating conditions constant. The catalyst recycle flow and water recycle flow were kept in constant ratio. FIG. 7 shows these effects across a range of relative lean absorbent feed rates to gas feed rates.

The following observations are made from the trend in FIG. 7. Increasing the lean absorbent feed rate increases leakage in the column bottoms. The corresponding EO in the off gas remains below 10 ppmv in this range. This is contradictive to traditional absorber behavior where increasing the lean absorbent circulation rate should remove more soluble components from the gas and dilute them in the liquid. As described in Example 4 this is a reactive system and the increased circulation rate reduces the liquid residence time in the column. However, comparing the effects on EO concentration in the column bottoms from Example 4 with Example 6 demonstrates the dilution of catalytic species is more impactful than just the liquid residence time.

Example 7

Figure 8:
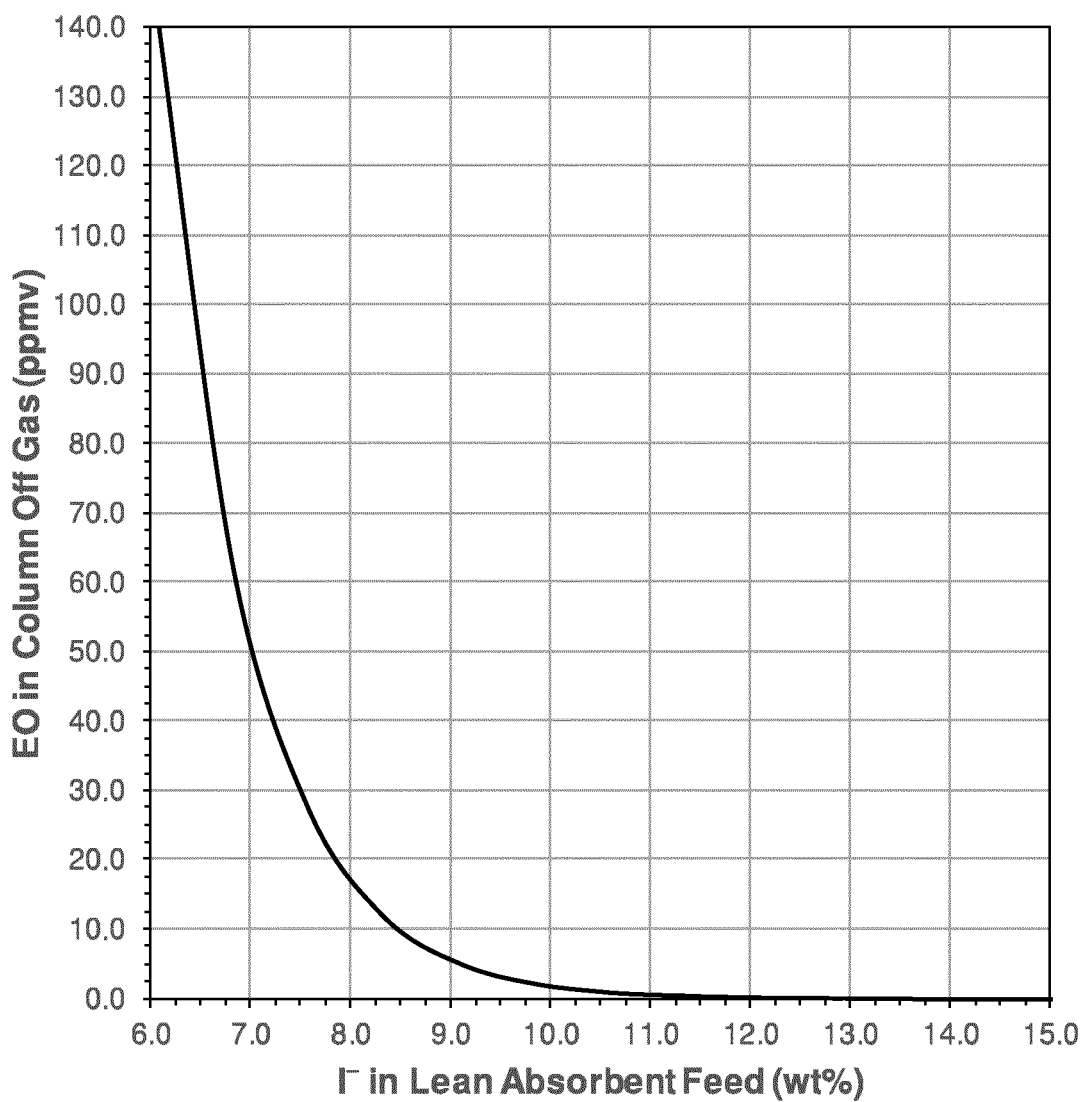
FIG. 8 depicts data from Example 7.
Figure 9:
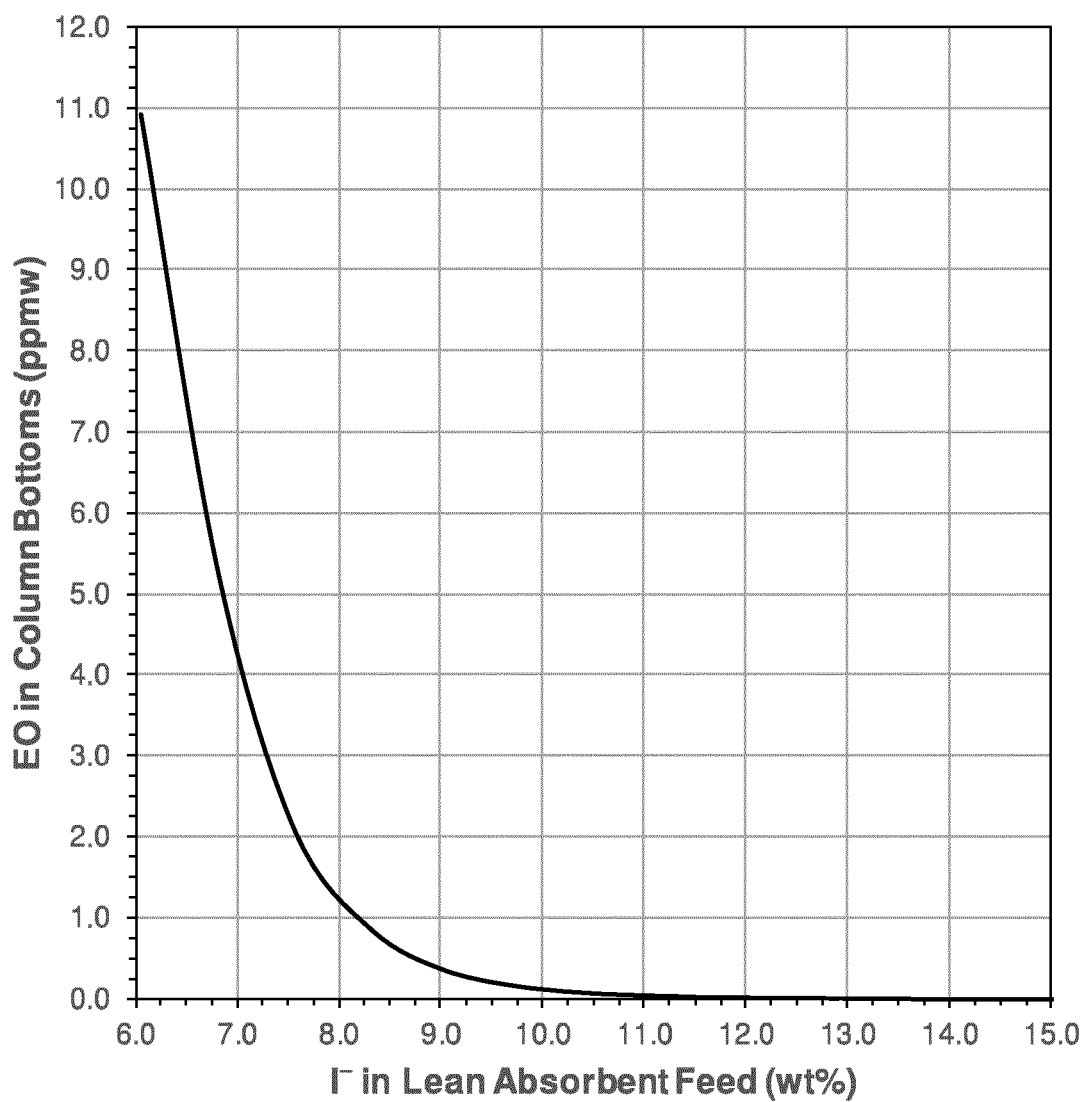
FIG. 9 depicts data from Example 7.

The predictive model was used to calculate the effect of iodide catalytic species concentration in the lean absorbent feed on leakage from the absorber keeping all other operating conditions constant. FIGS. 8 and 9 show these effects across a range of iodide concentrations in the lean absorbent feed.

The following observations are made from the trends in FIGS. 8 and 9. Increasing the catalyst concentration reduces EO leakage in both the column off gas and bottoms. This is because the EO consumption rate increases with the catalyst concentration.

Example 8

Figure 10:
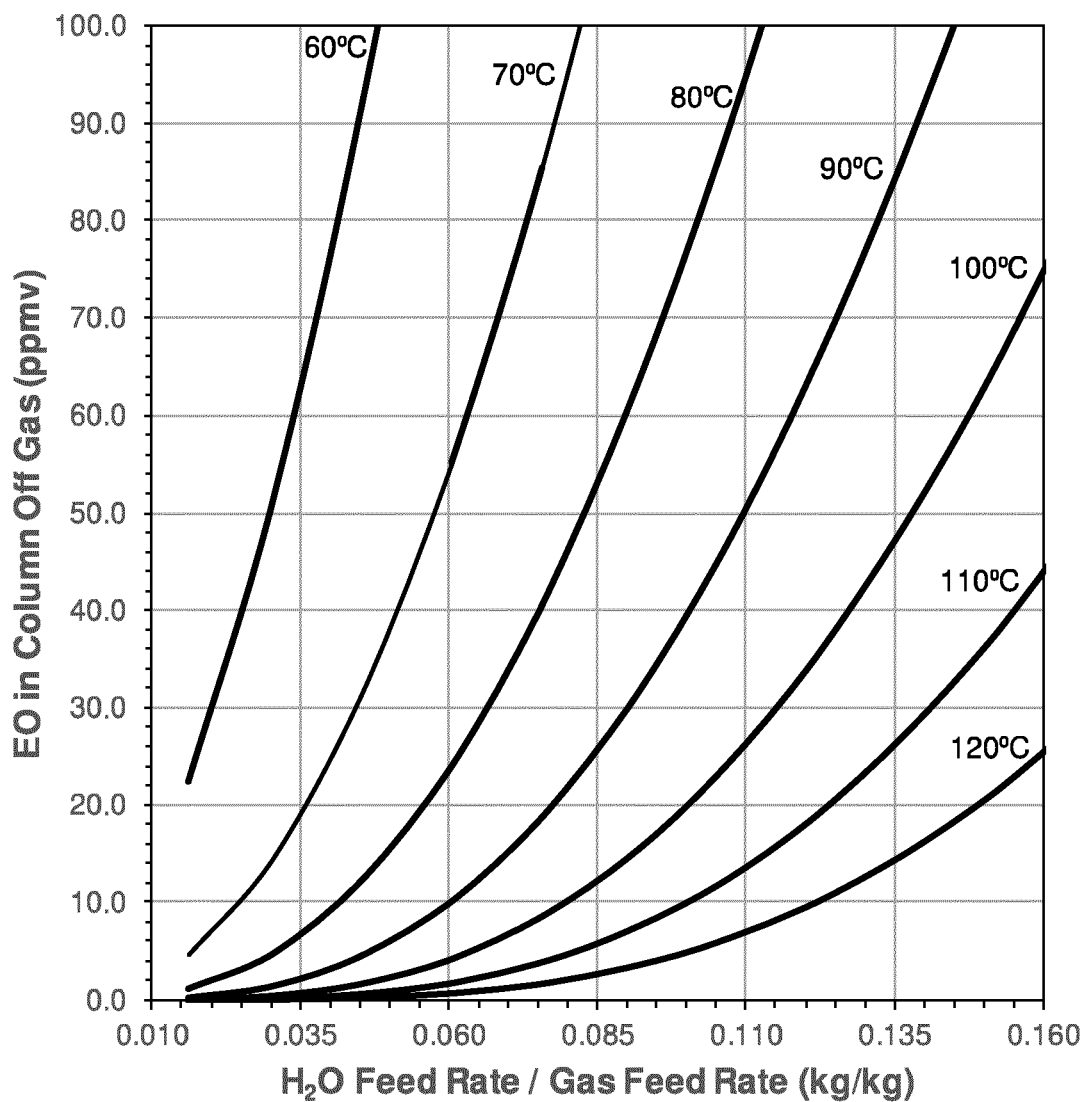
FIG. 10 depicts data from Example 8.
Figure 11:
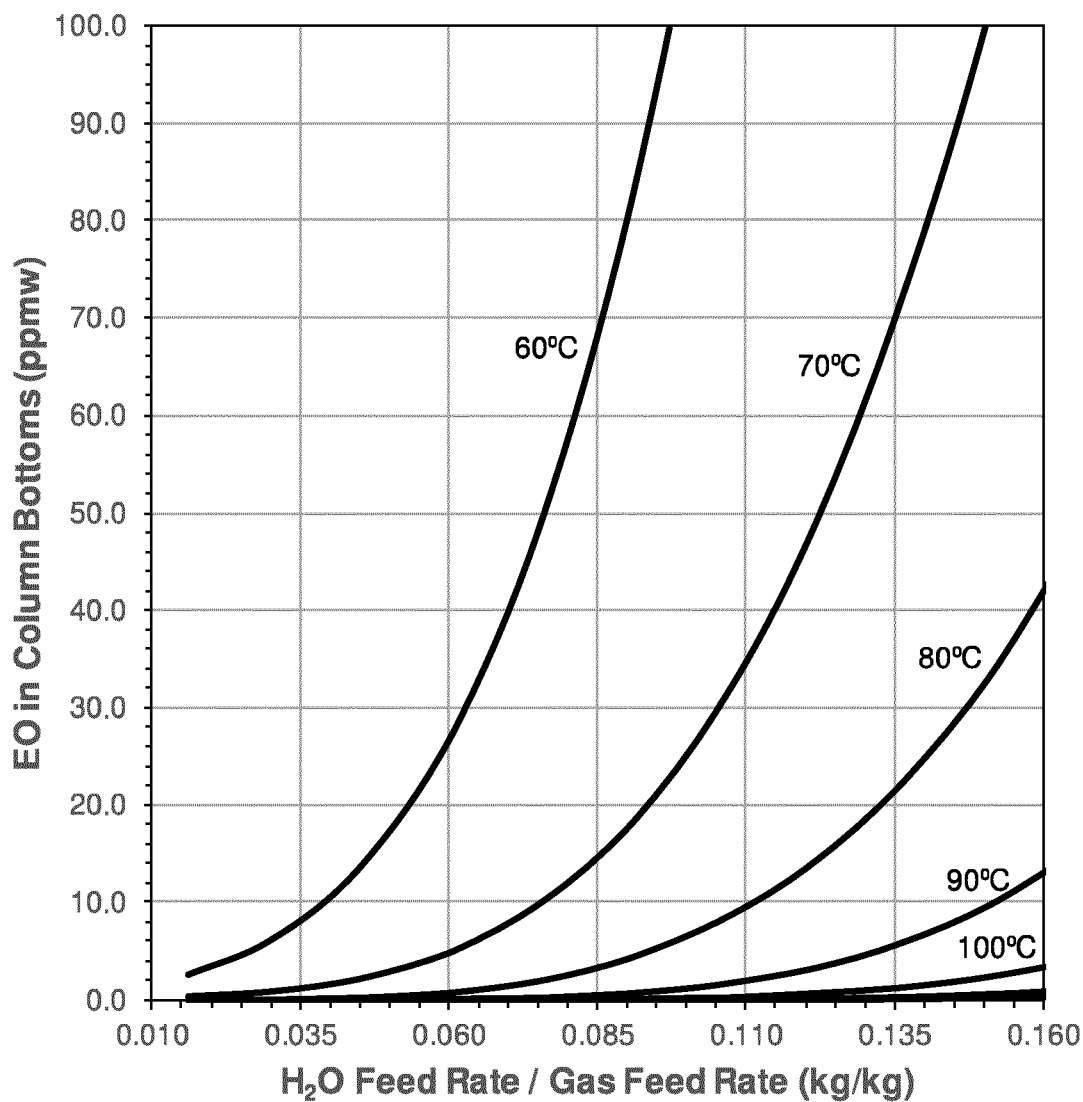
FIG. 11 depicts data from Example 8.

Certain regions of the ranges plotted in Examples 2-7 showed EO leakage higher than the preferred limits when varying only a single operating condition. Thus, the predictive model was used to demonstrate how the combination of gas feed temperature and relative water feed rate to gas feed rate can be used to control leakage from the absorber for an EO concentration of 1.0 mol % in the EO Reactor product keeping all other operating conditions constant. FIGS. 10 and 11 show these effects across combinations of the range of gas feed temperatures from Example 3 and the range of relative water feed rates to gas feed rates from Example 4.

The following observations are made from the trends in FIGS. 10 and 11. Despite the EO Reactor product only having an EO concentration of 1.0 mol %, it is possible to reduce EO leakage in the off gas and bottoms below their most preferred levels by increasing the EO consumption rate. This is done by generating a higher column temperature, higher iodide catalyst concentration, and/or a higher liquid residence time in the column as the operating conditions are changed.

We claim:

1. A process for the preparation of ethylene glycol from ethylene comprising the steps of:
    a) supplying a first gas composition comprising ethylene oxide and carbon dioxide to an ethylene oxide absorber through a gas inlet, the absorber comprising an absorption section of vertically stacked trays, and allowing the gas composition to pass upwards through the absorption section;
    b) supplying a lean absorbent to the top of the absorption section and allowing the lean absorbent to pass downwards through the absorption section;
    c) intimately contacting the gas composition with lean absorbent on the trays in the absorption section in the presence of one or more catalysts that promote carboxylation and hydrolysis to produce a fat absorbent stream comprising ethylene glycol and ethylene carbonate;
    d) withdrawing fat absorbent from the absorber; and
    e) withdrawing a second gas composition from the top of the absorber;
    wherein the first gas composition comprises from 1 to 7 mol % of ethylene oxide, the second gas composition comprises from 1 to 10 mol % carbon dioxide and the temperature of the first gas composition is from 60° C. to 160° C.

2. The process of claim 1, wherein the first gas composition comprises ethylene oxide, ethylene, oxygen, carbon dioxide and water vapor, and preferably is derived from the reactor product of an ethylene oxide reactor, in which ethylene is reacted with oxygen in the presence of a catalyst in a reactor to form ethylene oxide.

3. The process of claim 1, wherein the first gas composition comprises from 1 to 5 mol % of ethylene oxide.

4. The process of claim 1, wherein the second gas composition comprises from 1 to 5 mol % of carbon dioxide.

5. The process of claim 1, wherein the temperature of the first gas composition is from 60° C. to 120° C.

6. The process of claim 1, wherein the lean absorbent feed temperature is from 50° C. to 160° C.

7. The process of claim 1, wherein the fat absorbent comprises less than 100 ppmw of ethylene oxide.

8. The process of claim 1, wherein the second gas composition comprises less than 100 ppmv ethylene oxide.

9. The process of claim 1, further comprising feeding water to the absorber wherein the ratio of water feed rate to gas feed rate is in the range of from 0.01 to 0.15 kg water in liquid feed per kg of gas feed.

10. The process of claim 1, wherein the catalyst comprises iodide and the amount of lean absorbent added to the absorber is in the range of from 0.16 to 0.46 kg of lean absorbent feed per total kg of gas feed.

11. The process of claim 1, wherein the amount of iodide catalyst in the absorbent feed stream is in the range of from 7.5 to 15 wt %.

* * * * *